US009185530B2

(12) United States Patent
Gomes et al.

(10) Patent No.: US 9,185,530 B2
(45) Date of Patent: Nov. 10, 2015

(54) GROUP PROCEDURES FOR MACHINE TYPE COMMUNICATION DEVICES

(75) Inventors: Sylvie Gomes, Douglaston, NY (US); Diana Pani, Montreal (CA); Bhaskar M. Anepu, Hummelstown, PA (US); Christopher Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 98 days.

(21) Appl. No.: 13/638,742

(22) PCT Filed: Apr. 1, 2011

(86) PCT No.: PCT/US2011/030897
§ 371 (c)(1),
(2), (4) Date: Feb. 7, 2013

(87) PCT Pub. No.: WO2011/123755
PCT Pub. Date: Oct. 6, 2011

(65) Prior Publication Data
US 2013/0130684 A1    May 23, 2013

Related U.S. Application Data

(60) Provisional application No. 61/320,376, filed on Apr. 2, 2010.

(51) Int. Cl.
*H04W 4/08* (2009.01)
*H04W 8/18* (2009.01)
(Continued)

(52) U.S. Cl.
CPC .............. *H04W 4/08* (2013.01); *H04W 8/186* (2013.01); *H04W 36/04* (2013.01); *H04W 88/04* (2013.01); *H04W 4/005* (2013.01); *H04W 4/20* (2013.01); *H04W 84/18* (2013.01); *H04W 84/20* (2013.01)

(58) Field of Classification Search
CPC ....... H04W 8/186; H04W 36/04; H04W 4/08; H04W 88/04; H04W 84/18; H04W 4/005; H04W 4/20; H04W 84/20
USPC ........................... 455/435.1, 435.2, 436–444
See application file for complete search history.

(56) References Cited

U.S. PATENT DOCUMENTS 7,355,997 B2    4/2008  Qian et al.
8,755,825 B2 *  6/2014  Pinheiro et al. ............... 455/458
(Continued)

FOREIGN PATENT DOCUMENTS

CN        101163975 A     4/2008
JP        2007243794 A    9/2007
(Continued)

OTHER PUBLICATIONS

3rd Generation Partnership Project (3GPP), RP-090991, "New SI proposal: RAN Improvements for Machine-type Communications", Huawei, Alcatel-Lucent, CATR, China Unicom, CMCC, Ericsson, Fujitsu, LG Electronics, Panasonic, Philips, Qualcomm Europe, ST-Ericsson, Telecom Italia, Verizon, ZTE, 3GPP TSG-RAN, Meeting #45, Sevilla, Spain, Sep. 15-18, 2009, 5 pages.
(Continued)

*Primary Examiner* — Ajit Patel
(74) *Attorney, Agent, or Firm* — Condo Roccia Koptiw LLP

(57) ABSTRACT

Systems, methods, and instrumentalities to optimize procedures relating to machine type communication devices. Individual UEs may be grouped together in order to optimize procedures relating to members of the group. For example, a group of UE devices may be predefined or a group may be configured by a network associated with the UEs. One or more of the members of the group may be designated as a special UE or a master UE. The special UE or master UE may perform an action on behalf of one or more members of the group.

12 Claims, 4 Drawing Sheets

(51) Int. Cl.
*H04W 36/04* (2009.01)
*H04W 88/04* (2009.01)
*H04W 84/18* (2009.01)
*H04W 84/20* (2009.01)
*H04W 4/00* (2009.01)
*H04W 4/20* (2009.01)

(56) References Cited

U.S. PATENT DOCUMENTS

2007/0104148 A1    5/2007   Kang et al.
2009/0310561 A1   12/2009   Grob et al.
2010/0325267 A1*  12/2010   Mishra et al. .................. 709/224
2011/0019615 A1*   1/2011   Krco et al. .................... 370/328
2012/0282956 A1*  11/2012   Kim et al. ..................... 455/466

FOREIGN PATENT DOCUMENTS

JP    2010045525 A      2/2010
JP    2010056880 A      3/2010
WO    WO 2009088877 A2  7/2009
WO    WO 2011123755 A1  10/2011

OTHER PUBLICATIONS

3rd Generation Partnership Project (3GPP), TS 22.368 V0.4.0, "3rd Generation Partnership Project; Technical Specification Group Services and System Aspects; Service requirements for machine-type communications; Stage 1 (Release 10)", May 2009, 21 pages.

* cited by examiner

GROUP PROCEDURES FOR MACHINE TYPE COMMUNICATION DEVICES

CROSS-REFERENCE TO RELATED APPLICATIONS

This application is the 35 U.S.C. §371 National Stage of Patent Cooperation Treaty Application No. PCT/US2011/030897, filed Apr. 1, 2011, which claims priority to, U.S. Provisional Patent Application No. 61/320,376, filed on Apr. 2, 2010, the contents of which are hereby incorporated by reference in its entirety.

BACKGROUND

Machine type communication (MTC) is a form of data communication which may involve one or more devices or entities that do not necessarily need human interaction in order to communicate. Respective communication networks may include any number of MTC capable devices. Metering devices or tracking devices are typical examples of MTC devices. As used herein, the term user equipment (UE) may include MTC devices.

Capabilities of MTC devices may vary, and the capabilities of the MTC devices may depend on the requirements of one or more MTC applications. Categories of features of machine type communications may include one or more of: Time Controlled, Time Tolerant, Packet Switched (PS) Only, Online Small Data Transmissions, Offline Small Data Transmissions, Mobile Originated Only, Infrequent Mobile Terminated, MTC Monitoring, Offline Indication, Jamming Indication, Priority Alarm Message (PAM), Extra Low Power Consumption, Secure Connection, Location Specific Trigger and Group Based MTC Features including Group Based Policing and Group Based Addressing.

The number of MTC devices in use may grow quickly, for example, with deployment of M2M. Current procedures designed for user equipment (UE) may not be optimized for groups of UEs. For example, redundant location information may be sent by each UE in a group to the network leading to a high signaling load and to unnecessary UE battery consumption. In some scenarios UEs may be moving together or co-exist together as a group, in which case the triggering of certain procedures, such as mobility, including cell updates and location registration (or RA/TA) updates, or RRC establishment, may cause unnecessary excessive signaling and overloading of the air interface and the network itself.

SUMMARY

Systems, methods, and instrumentalities are disclosed to optimize procedures relating to machine type communication devices. Individual UEs may be grouped together. For example, a group of UE devices may be predefined or a group may be configured by a network associated with the UEs. One or more of the members of the group may be designated as special UEs or a master UEs. A master UE may be able to communicate with other members of the group. A special UE or master UE may perform an action on behalf of one or more members of the group. Group mobility procedures may be optimized by having the procedures controlled by a special UE or master UE. Procedures that may be performed by a special UE or master UE may include one or more of: measurements, handover, cell selection/reselection, as well as other group procedures like registration and connection establishment in idle mode and connected mode.

A special UE or master UE may perform cell reselection measurements and cell reselection on behalf of the group. The special UE or master UE may send a cell update to a network indicating the cell reselection. The network may communicate the cell reselection to the members of the group (e.g., to notify the members of the group to change cells). That is, the cell update may act as a trigger to the network to communicate the cell reselection to the members of the group. The master UE may communicate the cell reselection directly to the members of the group.

UEs of the group (i.e., members of the group) may detect the presence of master equipment (e.g., master UE) and choose to connect to the master UE. The connection may be established by a member registering with the master UE.

The methods disclosed herein may provide one or more of the following optimizations: optimization of mobility procedures for MTC devices moving as a group to limit UE battery consumption, limiting the signaling load generated by the mobility procedures for MTC devices moving as a group, limiting the simultaneous signaling for MTC devices moving as a group and other group procedure optimizations like registration and connection establishment.

DETAILED DESCRIPTION OF ILLUSTRATIVE EMBODIMENTS

FIGS. 1A, 1B, 1C, and 2 may relate to exemplary embodiments in which the disclosed systems, methods and instrumentalities may be implemented. However, while the present invention may be described in connection with exemplary embodiments, it is not limited thereto and it is to be understood that other embodiments may be used or modifications and additions may be made to the described embodiments for performing the same function of the present invention without deviating therefrom. Further, the figures may illustrate call flows, which are meant to be exemplary. It is to be understood that other embodiments may be used. Further, the order of the flows may be varied where appropriate. In addition, flows may be omitted if not needed and additional flows may be added.

Although described within the context of 3GPP UMTS and LTE wireless communications systems, the methods disclosed herein may be applied to any other wireless technology, including, but not limited to, GERAN, LTE-A and WiMax.

Figure 1A:
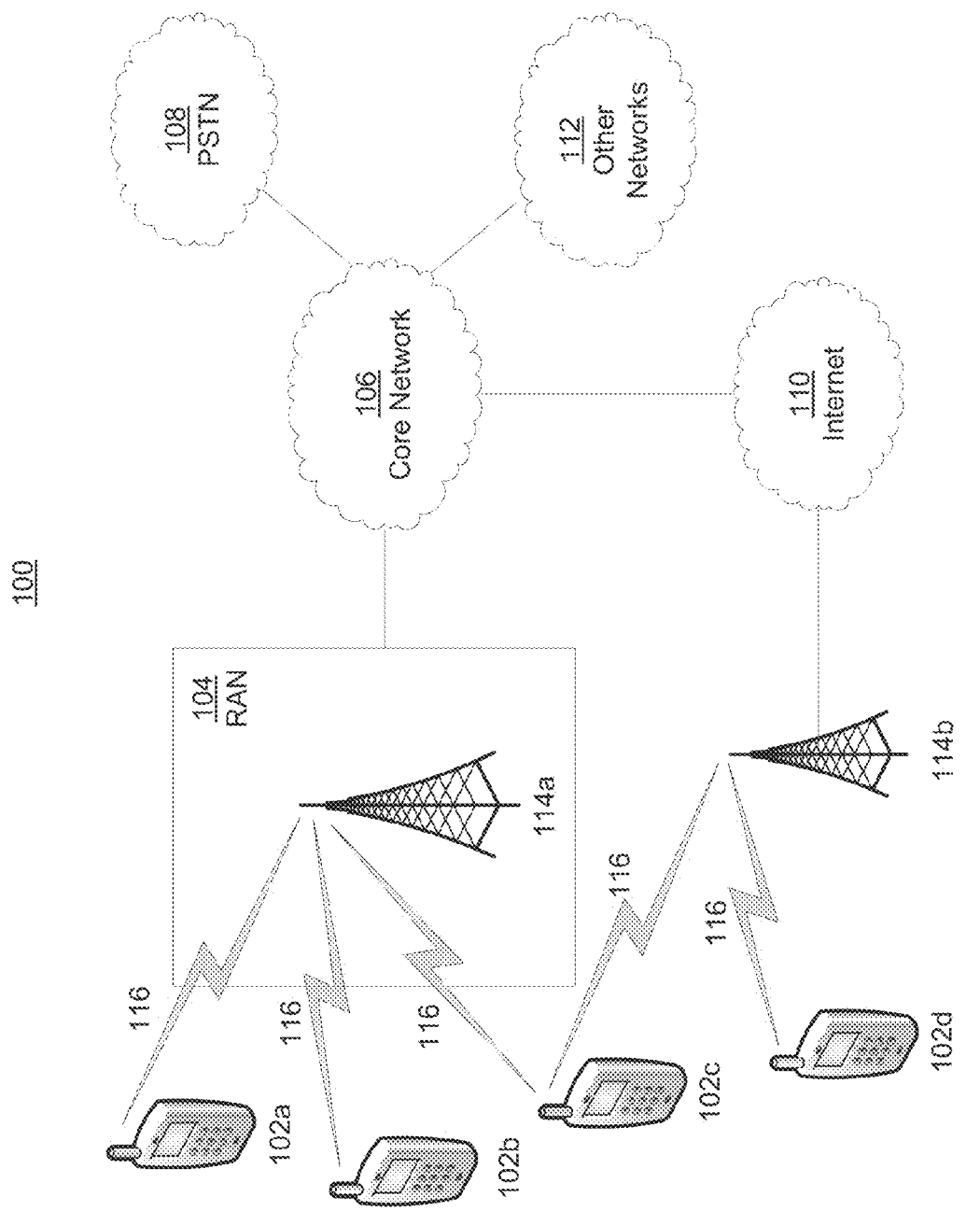
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
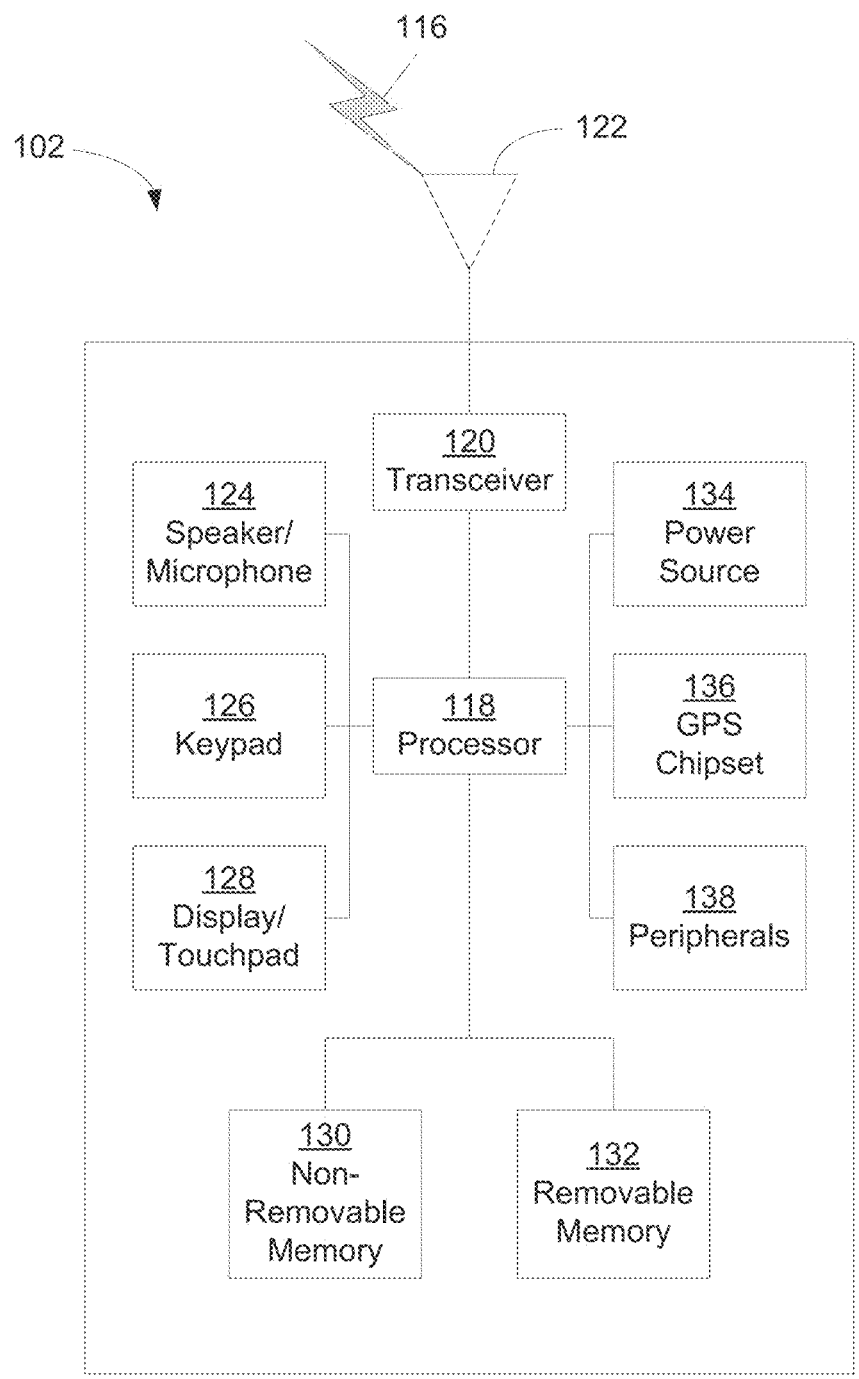
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
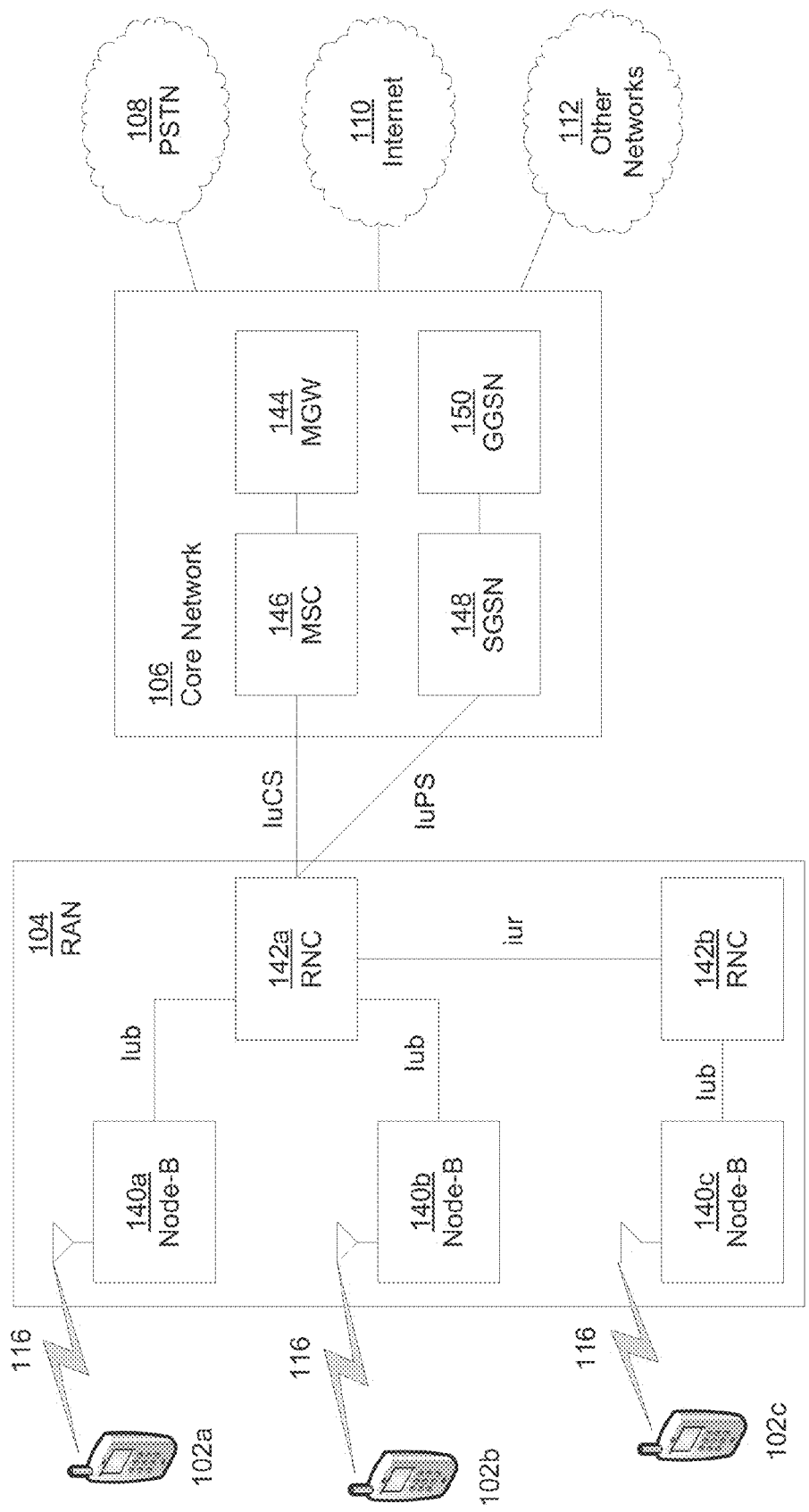
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Disclosed embodiments may introduce solutions for optimizing group mobility procedures such as measurements, handover, cell selection/reselection procedures, as well as other group procedures like registration and connection establishment in idle mode and connected mode as well. Although exemplary embodiments may be illustrated with reference to MTC devices, the disclosed concepts may be implemented with other devices, e.g., other devices that are capable of using group mobility procedures.

Different types of UE groups may be created. For example, a predefined group of MTC devices may be created. The predefined group may be together for a predetermined or known amount of time or may be together indefinitely. These UEs in the predefined group may share a common identity or may be identified by a specific group identity.

A group may be configured by the network and be determined as part of the MTC registrations. Further, UEs may be pre-configured with a common group identity. The network may determine that the UEs are part of the same group via one or more of the following.

The network may determine that the UEs belong to the same group if the UEs use the same identity when registering.

The MTC controller may indicate to the network existing MTC device groups along with the identity of each MTC device for each group.

An ad hoc group of devices may be created. The ad hoc group may exist for a temporary period of time. The network may determine that the UEs are part of the same ad hoc group via one or more of the following.

In connected mode, depending on the location and measurements reported by the UEs, the network may determine that there is a group of UEs staying together or moving together if it receives approximately the same measurements for the same neighbor cells from the UEs for a certain period of time. When the measurements start to differ for one UE for a certain period of time or not, the network may determine that the UE left the group.

UEs may register to master equipment and the master equipment may report the list of UEs belonging to the group to the network. In contrast to a macro cell, the master equipment may cover a small area which may define the size of the group. When determining that certain UEs are part of an ad hoc group, the network may provide the UE with a group identity that may be used to perform the procedures described herein. This does not preclude the network from providing a UE specific identity, or to provide an identity wherein part of the bits are common to the UEs and the other part is unique for each UE within the group.

The network may determine that a UE belongs to a group as part of a registration procedure. The network may be aware that certain subscriptions and locations where the UE is located correspond to a group.

The group procedures described herein may be applicable to other methods of determining and configuring a group.

One or a subset of UEs may perform procedures on behalf of UEs of the same group. The UE or UEs performing such procedures may be referred to as a special UE or special UEs (or alternately as a master UE or master UEs). A master UE may be an instance of a special UE; a master UE may be capable of performing as a special UE and may be capable of communicating with other UEs (e.g., UEs that belong to the group).

Reference may be made to solutions that are described in terms of idle mode state. However, it should be understood that at least some of the concepts and solutions may be applicable to other states, such as connected mode or sub-states within idle mode and connected mode.

A UE may determine that it is a special UE using one or more of the following.

A pre-configuration in the device (for example in the USIM) may indicate to the device that it is a special UE.

The UE may be explicitly assigned the task of being a special UE at initial registration, for example, via NAS signaling. This may be performed with one or more of the following.

New IE's may be added in the NAS registration response message or a new NAS message may be defined (the NAS may notify the RRC sub-layer in the network and the UE).

Assignment may be signaled at the RRC level, for example an RRC message sent by the network to the UE after the NAS registration or IE's added in the Downlink Direct Transfer for UMTS or DlInformationTransfer for LTE indicating to the RRC that the UE is to perform or not perform the procedures.

A UE may be assigned a special UE identity within the group, for example, a UE having a certain IMSI or a certain IMEI, or for instance a temporary identity assigned to the UE, or a new type of identity (e.g., if a UE within a group is uniquely identified, a special identity such as the first number available (e.g., 0) or any other predefined number may designate a special UE).

A formula may be used (e.g., a UE with special results may be the one performing the procedures), for example, a UE for which UE identity mod (x)=0 may be designated a special UE.

A UE may draw a Random Number between 0 and 1, where if R>X, where x is a predefined number, then the UE may be designated a special UE and perform group procedures.

The network may determine that a UE is a special UE. However, the network may not need to indicate this to the UE (i.e., the UE determined by the network to be a special UE). For example, if the procedures to be followed by the special UE, such as the optimization procedures described herein, include procedures performed by legacy UEs, the UE may not need to be notified that it is a special UE. The network may configure the UE with a group identity that the UE may include in UL messages when a procedure is triggered, e.g., an optimization procedure as disclosed herein.

UEs that do not meet the above mentioned criteria may not be considered as special UEs within the group. The network may indicate to a UE that the UE is not a special UE and/or configure the UE to operate according to one or more of the optimization procedures described herein for 'non-special' UEs. Procedures performed by a non-special UE associated with a group (optimization procedures) may be different from procedures performed by the UE when it is not associated with a group. An optimization procedure may modify a procedure for communication with a network. For example, the optimization procedures may reduce transmission overhead by reducing the amount of communication traffic sent to the network (e.g., by non-special UEs). The UE may be configured with a group identity in order to perform optimization procedures.

Special behavior within the group may also be configured by the network as part of the MTC subscription. For instance, some groups may not have special UEs and this may be configured by the network or predefined in the subscription.

A network may also be able to notify a change of behavior to one or more members of the group of UEs. For example, if a special UE leaves the area or the connection with the special UE has been lost, the network may notify the other UEs that they can perform normal operation, or alternatively, assign a new special UE or UEs. This notification may be implemented as new IE's in the paging message, or in a RRC connection setup or any other existing RRC message, or in a new RRC message, and, may include one or more of the following pieces of information: an indication to resume normal operations; an indication to stop normal operations and rely on a special UE until a new notification is sent or for a certain period of time; and, an indication that the special UE has changed.

When a special UE leaves the group, it may notify the network via RRC signaling. The network may notify the rest of the UEs in the group, configure a new special UE, or change the configuration of a non-special UE. When changing the configuration of a non-special UE, the network may indicate to the non-special UE that it is to release the optimization procedures, e.g., the network may indicate to the non-special UE that it is to stop performing the optimization procedures associated with non-special UEs. If a special UE leaves the group without notifying the network, the network may determine that the special UE has left by receiving UL control message transmissions from non-special UEs or by noticing that the special UE is no longer in the area due to the special UE not responding to periodic triggering or lack of dedicated connection.

As part of the solutions disclosed herein, special UEs may be in charge of performing one or more procedures associated with the group. For example, in order to limit the signaling load and battery consumption associated with taking measurements, a special UE may perform measurements. When a special UE is designated to perform the procedures associated with the measurements, the other UEs may be precluded from performing those procedures.

In the case of cell reselection procedures and idle mode procedures, in order to avoid having the UEs moving as a group send a simultaneous message to the network to indicate they are entering a new area or have reselected a new cell, the special UE may perform neighbor cell measurements on behalf of the whole group.

A special UE performing the measurements may also monitor the criteria required to initiate certain procedures such as cell reselection, cell updates, location area (TA/RA) updates, RRC connection establishment procedures, etc. The special UE may perform the normal cell selection/reselection and area update procedures. When the criteria are met, the special UE may initiate the procedure. For example, if cell reselection is performed, the special UE may send a cell update to the network indicating the cell change. The cell reselection and cell update procedures may be behavior that is typical for a UE not associated with a group (e.g., a legacy UE). The UE determined by the network to be a special UE may not be notified that it is a special UE, allowing the UE to behave like legacy UEs.

Non-special UEs, such as UEs configured with optimization procedures, may not perform measurements of neighboring cells and may not be aware that a change of best cell has occurred. Solutions described herein may allow for notifying the other UEs of the change of cell. Although the procedures described below may be described in the context of cell update, they may also be equally applicable to URA update and other procedures.

The other UEs may be notified that the change of best cell has occurred via paging mechanisms. More specifically, when the network receives an indication of a change of area or cell from one UE or a subset of UEs in the group, the network may page the rest of the UEs in the group over the source cell indicating the new target cell in the paging message. The paging may be done for the group of UEs and addressed to the UEs within this registered group simultaneously. Additionally, a new paging cause may be introduced to allow the transmission of this information. The paging may indicate one or more of the following to the UEs: the PCI/PSC of the cell which was reselected by the special UE; the cell identity/CGI of the cell; the location, routing, or tracking area of the cell; and, the system information required by the UE to access the target cell.

The paging may act as an indication for a UE indicating that a cell reselection by the special UE has taken place and/or that the paged UE should also perform cell reselection. The behavior of the UE upon this indication is described below. This indication may be achieved by modifying the paging message itself, (e.g., by adding a one bit information or a new paging cause) or alternatively, by paging the group over the PICH without sending a paging type 1 message. The paging occasion and the PI and the PF (Paging Frame) that are used for this purpose may be determined according to the group ID, or a special PI, PO and PF may be reserved for the group of UEs (it may be any of the allowed PI, PO and PF or one of the reserved bits that is used). A paging over such occasion may be an implicit indication for these non-special UEs to wake for measurement purposes. A special value of the P-RNTI may be used so that the UEs can distinguish between normal paging and this special type of paging at the MAC level.

The other UEs (e.g., non-special UEs in the group) may monitor the paging message and when such paging indication or message is received over the currently camped cell, one or more of the following may be performed.

The UE may start measurement for the target PSC/PCI explicitly provided to the UE and perform cell reselection if the cell reselection criteria to the cell are met.

The UE may reselect the indicated cell without measurements, according to the PSC/PCI provided in the message. The UE may initiate a reading of the system information in the PSC/PCI to attempt connection to the cell. Alternately, system information required for the UE to connect to this cell may be provided in the message as well, which may speed up the connection to the cell.

The UE may trigger initiation of measurements and the UE may ensure that cell reselection criteria is met prior to performing cell reselection, examples may include one or more of the following.

The UE may start performing measurements to one or more than one neighbor cells. In order to speed up the cell reselection procedure, the UE may not wait for a Treselection period that the neighbor cell is better than the serving cell. Cell reselection criteria may include that one of the neighbor cells has a signal quality that may be better than the serving cell quality. Alternatively, a shorter Treselection may be used.

If a page to perform cell reselection without specific information is received, the UE may find the best cell around and reselect with or without waiting for Treselection.

To randomize the selection and initiation of procedures from the UE, the Treselection timer for these examples may be a maximum timer the UE may use. More specifically, the UE may choose a random number between 0 and Treselection to use as the actual Treselection timer to the new cell.

In an example, upon reselection to the target cell a non-special UE (i.e., a UE that belongs to the group, but is not a special UE or a master UE) may initiate the procedure itself and send an area update (LAU/RAU/TAU) or cell update request to the network depending on the UEs mode of operation. In an example, the UE may reselect to the new cell but not transmit a CELL UPDATE or a UL message as described herein.

A non-special UE, e.g., a UE configured to perform optimization procedures may perform measurements, monitor the neighboring cells, and perform normal cell reselection evaluation. When a cell reselection criteria is met, the UE may reselect to the new cell, acquire the system information, and monitor the downlink for reception of data (e.g., monitor a source cell for a confirmation message). The UE may not initiate a CELL_UPDATE procedure (or other UL data, such as LAU/RAU/TAU or RRC connection request) once they have reselected to a target cell. This may allow the UE to save on UL individual requests and individual procedure initiation. The UE may reselect the new cell and stay in reception for a configured period of time (e.g. X TTI's or X frames or X in units of time such as ms or s). The period of time may correspond to an existing timer used for waiting of a response (e.g. in HSPA cell update timer T302) or a new timer used for this procedure may be configured. This procedure may be applicable where the UEs do not perform measurements. A page may be used as a reselection and wake up mechanism as described herein (e.g., upon a page indicating a cell reselection, the UE may reselect to the new cell according to the procedures described herein and does not send a cell update). If the UE is in CELL_PCH, the UE may move to CELL_FACH and monitor the downlink without sending a CELL UPDATE.

As an example, a non-special UE may forego sending a cell update to the network when a confirmation message is received, e.g., during a certain time period. However, the non-special UE may send a cell update to the network when a confirmation message is not received, e.g., during a certain time period.

The UE may monitor the downlink for a configured period of time waiting for a confirm message, such as a Cell Update confirm message or a RRC Connection Setup message or the NAS confirm message, over the target cell. A pre-stored default configuration or broadcasted configuration may be used by the UEs to be able to receive the downlink message over the target cell or the reselected cell. The network, if it received a CELL UPDATE from a special UE, may send a confirm message addressed to the determined group of UEs, which may wait for the message on the new reselected cell. The message sent to the UEs may be a group message, e.g., sent via a group ID, or, it may be sent individually to each UE within the group, e.g., within the pre-configured period of time. Alternatively, one message may be sent to all UEs comprising the common information and it may include the individual information in the form of a list, e.g., within one message. The common information may include configurations for SRB's, radio bearers, transport channels, physical channels and other parameters common to UEs in the group. The individual information for each UE may include a list of individual identities being addressed, for example, a list of IMSIs, a list of new temporary identities like different types of RNTIs, and optionally a list of other parameters specific to each UE may be included. A one to one mapping may be used by the UE to figure out which specific configuration is dedicated for the UE, i.e., the UE corresponding to the first individual identity (e.g., IMSI) in the list, may be assigned the first configuration of the other lists, e.g., the first temporary identity of the list of RNTI's, the UE corresponding to the second individual identity in the list would be assigned the second configuration of the other lists and so on. For each entry in the configuration list, a UE identity may be specified so the UEs may uniquely identify the configuration that is applicable to the UE.

If no Confirm message is received in the DL for the configured period of time, the UE may trigger the initiation of an uplink message, such as CELL UPDATE or RRC connection request, or a NAS message.

A similar concept may also be applicable for periodic uplink messages such as CELL UPDATE, URA UPDATE or LAU/TAU/RAU UPDATE. For example, a UE configured with this procedure, may not initiate the periodic timers (e.g. T305 for HSPA or an NAS related timer). Alternatively, the periodic timer may be initiated, and once expired, the UE may not send an uplink transmission. The UE monitors the downlink for a confirm message as described herein for a configured period of time. Alternatively, the UE may perform periodic message transmissions regardless of its configuration.

The procedure may be finalized in the source cell. For instance, a paging may trigger the UE to wake up for reception for a configured period of time, e.g. x TTI's or X frames in the source cell. A Cell Update Confirm or an RRC Connection Setup may be sent over the source cell to the UEs using a common message. Or, a NAS level area update confirm may be sent or an individual message (e.g. CELL UPDATE) may be sent to each UE. The message sent, e.g., the cell update confirm message or setup message, may be modified such as to indicate the cell identity or the PSC/PCI of the cell for which the configuration is provided. A pre-stored default configuration or broadcasted configuration may be used by the UEs to be able to receive the downlink message. The identity of the default configuration may be sent in the paging message. A default configuration, including the information for setting up the signaling radio bearers, may be broadcasted in the cell. Methods as disclosed herein may be implemented in the event that a confirm message has been received.

The UEs may camp on the new cell without having received the new configuration and the network may page the UEs on the new cell at different times, so that the UEs may connect with a new RRC connection request cause and receive the configuration from the network. This may be a way to randomize the requests.

The old cell may page the UEs at different times so that they do not move to the new cell at the same time. In this case, the UEs may communicate with the new cell for the configuration when they acquire the system information and camp on it. This way, paging on the new cell may be avoided.

Idle mode UEs may not notify the network when a cell reselection occurs in the UE. They may initiate an area update procedure when an area change is detected. Since the special UE may not notify the network of such change, the non-special UEs may not be aware of the change of cells, e.g., if the non-special UEs do not perform normal measurements. Therefore, in order to provide this information to the other UEs, one or more of the following may be performed.

These UEs may select a cell before starting a connection.

The UEs may monitor and measure neighboring cells, however, cell reselection rules may be updated for MTC devices. For example, the non-special UEs may measure the serving cell and if the serving cell signal quality and/or strength falls below a certain threshold, the UE may search for a better cell. This threshold may be a new threshold used for MTC devices or the group MTC or it may be a scaling factor applied to the existing Sintrasearch or another existing threshold. This threshold may be specific to a particular class of MTC devices. The procedures described herein may be applicable with the modified measurement rules.

The dedicated UE or subset of UEs may notify the other UEs of the cell reselection and provide the PSC/PCI and/or cell Identity/CGI via other non-3GPP technology, for instance Bluetooth, wireless LAN, H(e)NB, etc. Other information and behavior as described above may also be applicable for these idle mode UEs. The difference in behavior may be that the UEs would reselect to the new cell, without sending a cell update.

The MTC device may be allowed to communicate with the other MTC devices via the 3GPP network. The dedicated UE may send the cell reselection information to the network and the network may forward it to the rest of the UEs in the group via a paging message. Reselection information may be appended to the paging message.

A Master MTC device may communicate with the UEs in the group and page the other UEs to reselect the cell when it detects a cell reselection is required. This may be a paging on the downlink over the 3GPP network, with the restriction that this page may not require the UEs to wake up and start the usual procedures associated with receiving a paging response. The paging message may include PSC/PCI, cell id/CGI so that the UEs may directly camp on the new cell.

The master UE may stay in CELL_FACH or CELL_PCH state and may perform cell updates, but other UEs in the group may stay in idle mode. The paging mechanism or other mechanisms described above from the source cell may be used to indicate to the UEs to reselect and the UEs may not need to perform any cell update procedures. In the case of a (LAU/TAU/RAU), the UE may individually initiate the procedures, start monitoring the downlink of the target cell within sending an UL message, and/or send a group message using any of the mechanisms provided above.

Since non-dedicated UEs in the group may not send any RRC Connection Request or Cell Update when they enter a new area (LA/RA/TA) or reselect a new cell, they may not receive the response from the network, RRC Connection Setup or Cell Update Confirm, including a new configuration (radio bearers, transport channels, physical channels configuration). Exemplary solutions for sending the configuration information to the non-dedicated UEs in the group may include one or more of the following.

The RRC Connection Request or Cell Update may be used to indicate that the UE entered a new area or reselected a new cell to the network, and the network may not send any new configuration. A new cause may be added in the RRC Connection Request or Cell Update or a new signal may be defined. For example, the cause may be "New location for an MTC devices group."

The configuration information may be added in the paging as new IE's. To limit the size of the new IE's, a default configuration may be used so that the paging message is limited to the default configuration ID.

The confirmation message from the network may be sent to the UEs in the new cell via a group message using methods similar to the ones described above.

Cell selection/reselection procedures or other procedures may be updated so that the devices moving as a group select/reselect a different cell when possible (e.g., when more than one neighbor cell is better than the serving cell) or reselect the same cell but not at the same time. This may spread the time of uplink access This may be achieved with one or more of the following.

Each UE in the group may use a different Treselection value (time during which the neighbor cell has to be better than the serving cell). An offset may be added or subtracted to Treselection. This offset may: be hard-coded in each UE; depend on a UE unique identity like the IMSI or IMEI for example (offset may be for instance calculated as (UE Unique Identity) modulo (Treselection)); depend on an index assigned to each UE in the group via system information, configuration, or when manufactured (e.g., in case of metering devices staying together); and/or, be a random number selected by the UE between a minimum and maximum value. This concept may be applicable for a scaling value ranging between a configured min and max value. The non-special UEs may randomly select a value and apply it to the Treselection.

Instead of reselecting the best ranked cell, each UE in the group may reselect the N best ranked cell. N may be determined by using one or more of the following.

N may depend on the UE unique identity, for example, the IMSI or the IMEI. For instance, it may be calculated as (UE unique identity) modulo (number of ranked cells).

N may be a random number between 1 and a number of ranked cells.

N may depend on a value assigned to each UE in the group. This value may be broadcasted or configured with an RRC message. It may also be hard coded in the UE. N may be calculated for instance as (this value) modulo (number of ranked cells).

Each UE in the group may use a different offset when ranking the neighbor cells. This offset may depend on the UE unique identity like the IMSI for example or may be a random offset.

A solution that allows the randomization of the time in which messages are transmitted includes the possibility of spreading the time at which the messages or certain procedures are triggered in the RRC. More specifically, some RRC procedures such as CELL UPDATE for cell reselection purpose or area update (e.g., location area, routing area, or tracking area) may be triggered simultaneously by a group of UEs moving together. In order to spread out the time at which the procedures are triggered one or combination of the following procedures may be performed.

An offset to the time at which the criteria is met may be introduced, for instance a Treselection timer may be extended by an offset, for example when the criteria is met for Treselection+offset time, then the UE performs cell reselection. For other procedures, an offset may be applied to the time in which a procedure is triggered in the UE. The offset may be determined by: randomly choosing a number between zero and max configured time; the offset may correspond to a UE specific identity or a UE specific access ID (e.g., UEs within a group may be uniquely identified, numbered from zero to x); the offset may be determined based on a formula based for instance on IMSI or TMSI; and/or, each UE may be configured with an offset during the initial registration procedure.

This offset may be used to delay the triggering of the procedure, e.g., by waiting for the delay timer to expire after the criteria has been met. For example, in case of cell reselection, the criteria for reselecting to a new cell may remain that a cell remains the highest ranked cell for Treselection time period, however, the triggering of the procedures associated with cell reselection are delayed by the offset timer. The criteria to perform the procedure may need to be met and true throughout the offset period as well. For example, for cell reselection, the neighboring cell may need to be the highest ranked cell for Treselection+offset time period in order for the procedure to trigger.

The type of cell selection/reselection procedure to use may be indicated by the UE with one or a combination of the following: in system information, the network may indicate to the MTC devices if they should use an enhanced cell selection/reselection procedure or not and which one; and, there may be a default configuration stored in the MTC device.

The procedures described below may refer to procedures in connected mode LTE and CELL_DCH in UMTS.

Similar to the idle mode procedures, in order to limit the signaling load involved in the measurements in connected mode and/or to limit the usage of each UE battery due to neighbor cells measurements, one or a subset of UEs may perform measurements. This, in addition to methods described above, may be achieved using one or more of the following.

One or a subset of the devices in the group may perform the measurements in connected mode, and may receive measurement configuration in a measurement control and may send measurement reports to the network. Measurement reports and events may be sent from the UE or subset of UEs taking the measurements and detecting the events. Similar to idle mode procedures, all UEs may take measurements and perform event evaluation, however, the non-special UEs, e.g., UEs configured with optimization procedures, may not send an uplink message over the source cell.

The neighbor cells to measure may be split among the devices in the group. For example, the network may send a different list of cells to measure in the measurement controls. As another example, UEs in the group may autonomously measure a subset of the neighbor cells list (if it is a known group (metering devices) UEs may select a sub-list depending on an index unique in the group).

UEs in the group may take turns to perform the measurements, which may include one or more of the following.

The network dividing the UEs into subgroups and scheduling the different groups for measurements: the division of the UEs may be explicit (i.e., the UEs may know that they belong to a subgroup and what subgroup it is)—the network may communicate the subgroup to the UEs either via system information or dedicated signaling; and/or, the network may provide the normal measurement configuration to the UEs expected to perform the measurements and an 'empty' measurement configuration to the rest of the UEs.

Each subgroup of UEs may take turns for measuring the neighbor cells for N consecutive measurement occasions.

At the end of each UE or sub-group of UEs turn, the network may send a new measurement configuration to configure another UE (sub-group of UEs) to perform measurements.

The same configuration may be sent to each UE, but they may be given predefined times to measure, or a simplified explicit signaling may be sent to each UE to stop/start performing the measurements.

The special UEs may be in charge of performing measurement and monitoring of the criteria associated with the measurements. When criteria or certain measurement events are triggered, the special UE may send a measurement report to the network. The special UEs may operate like legacy UEs and may or may not need to be notified that they are special UEs. If the network makes the decision to perform a handover, it may need to notify the other UEs associated with the same group as the special UE. As an example, the network may individually send handover commands to the other UEs. The non-special UEs may monitor the downlink source cell for a handover message or a message modifying the UE's active set. If the UE has been configured with an enhanced serving cell change procedure and the target cell is in the preconfigured list of cells, the UE may start monitoring the target cells for a handover order or message, even though they did not send a measurement report. Similar to idle mode procedures, if a response is not received by the network within a configure time, the UE may initiate a measurement report and transmit the message in the UL.

In order to reduce the overhead associated with sending the handover complete message by the UE, an offset may be applied to the time within which the UE is supposed to respond. The offset may be configured by the network in the handover message or the UE may randomly chose a number between a configure min and max value. However, in order to reduce the signaling load during the handover, e.g., avoid sending the handover reconfiguration message to all UEs, one or more of the following may be used.

One handover reconfiguration message may be sent to the group of UEs instead of one handover reconfiguration message sent to each UE by using a group identity.

One UE, or a subset of UEs, may respond to the handover request (the rest of the UEs may be limited to answering in case of handover failure and not in case of success; this concept of only sending a failure answer may be extended to other RRC messages, not just RRC messages that include a reconfiguration for a handover).

If the network receives identical measurements from several devices, it may send an enhanced handover configuration message that may add a different delay for the handover to each device so that each device hands over to the new cell at a different time, and as a consequence, sends a response to the network at a different time (the network may also specify in the enhanced handover configuration to one or a subset of devices that they have to send a complete, while for the rest of the UEs, they may answer in case of failure).

A group message may be sent to a number of UEs. The network may have the option to indicate more than one UE identity in the message. The network may provide one common configuration and for UE specific information the network may provide it in the same message with a list; for instance, the RNTIs (Radio Network Temporary Identities) may all be provided in the same message. This may be applicable to any configuration message, including but not limited to cell update confirm, RRC connection setup, RRC connection reconfiguration, radio bearer setup/reconfiguration, transport channel reconfiguration, physical channel reconfiguration and other configuration messages. The message may include one or more of the following: common information (including but not limited to SRB's, radio bearers, transport channels, physical channels information); and, UE specific information like UE identities (a list of all the UE identities, for instance IMSI, being addressed, a list of new temporary identities (e.g., RNTI), and a list of other dedicated parameters may also be included).

A one to one mapping may be applied, i.e., the first UE identity (e.g., IMSI) gets a temporary identity the first temporary identity of the list. The same mapping may be applied for the rest of the UE specific configurations.

Master equipment (e.g., a master UE) may be able to communicate with the UEs of a group. Master equipment may perform procedures on behalf of UEs that the master equipment controls.

In order to manage and optimize group procedures, for example to reduce the signaling overhead or the battery consumption on certain UEs, dedicated master equipment may be in charge of performing certain procedures on behalf of the whole group. Master equipment as used herein may comprise one or more devices.

As used hereinafter, master equipment may be defined as equipment which would perform procedures on behalf of other UEs, including but not limited to: measurements, RRC connections establishment, network registration, handover procedures and/or cell selection/reselection procedures.

Further, master equipment may be equipment which can communicate directly with the UEs (e.g., as described below). Direct communication with the UEs may be performed over 3GPP communication or by using other non-3GPP communication.

Figure 2:
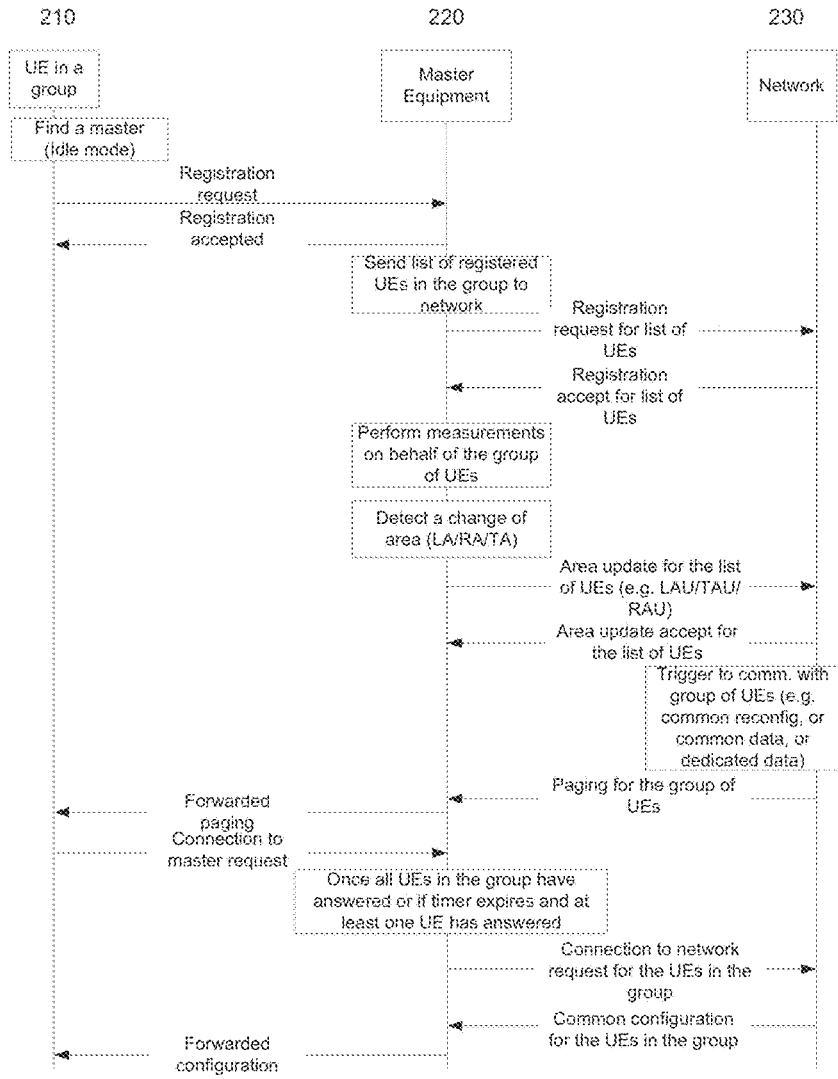
FIG. 2 illustrates a system with exemplary uses of master equipment to control and/or communicate with a network and one or more UEs in a group.

The master equipment may communicate with a group of UEs and with the network (see FIG. 2). Examples may be special relays with limited functionalities, H(e)NBs, UEs, master MTC UEs, light Node B (with limited functionalities), etc. The master equipment may communicate with the UEs and act as an actual cell. Some master equipment may not act as a cell, but may still be capable of communicating with other UEs. Master equipment may be static or may be mobile (e.g., on a truck, train etc.).

The master equipment may be configured by the network explicitly or determined via one or a combination of the procedures disclosed herein.

In order for the group of UEs to detect the presence of and choose master equipment, one or more of the following may be used.

UEs belonging to a certain group may be allowed to connect to the master equipment A UE may detect the master as it does with other cells (e.g., closest cell).

Master equipment may have a special identity: master equipment may use a certain PSC/PCI (in this case, there may be no need to read system information of master equipment); and/or, master equipment may use a certain Cell Identity of CGI (in this case, there may be a need to read system information of master).

A higher cell reselection priority or offset may be provided for the master equipment for the UE to prefer this cell over connecting to a different cell (e.g. a macro/pico/femto cell). Optionally, the UE may only attempt to perform or connect to a different cell if the quality of the master cell goes below a threshold or if the UE no longer detects the master cell.

Once a UE has detected a PSC/PCI, it may try to read the system information and, based on the Cell Identity/CGI included in the SI, may determine if it is a master.

Identities of the masters may be broadcasted by other cell—identity or PSC/PCI of master broadcasted in the (macro) cell under which the master is located: identity of which group the master equipment belongs to may be broadcasted; and/or, master equipment may register to the cell it is located in so that cell may start broadcasting its identity to other UEs.

New IE in system information of master cell may indicate that it is a master—may be in the MIB for fast detection or SIB. A master equipment broadcast may be limited to a MIB, or, a MIB and one or a few SIB's. They may not need to broadcast as much information as regular cells. Minimum information may include one or more of the following.

A Boolean indicating that it is master equipment or not.

A master identity which may be a cell identity/CGI or a different type of identity, for example, identities only used for master equipment.

A group identity to allow some UEs to register.

An indication of the type of master equipment, for example, to indicate if it is static or moving master equipment (e.g., on a train, a truck or other mobile vehicle).

The UE may be explicitly provided the information required to connect to the master equipment or to detect the master equipment. This may be provided in the NAS message, RRC message or any other registration message. The UE may be pre-configured with this information in the USIM.

The group of UEs may be known to the master equipment with one or more of the following.

When choosing new master equipment, UEs may have to register to the master equipment, so the master equipment knows which UEs it may need to communicate with.

If it is a known group, UEs may not need to register but master equipment is aware in advance of which UEs are in the group (e.g., for metering devices moving together). The master equipment may be notified via higher layer network signaling, NAS signaling, RRC, or pre-configured in the USIM.

The network may send a list of UEs in the group it received (e.g., from the MTC controller) to the master equipment.

UEs may remain linked together and the group may be permanent. However, one or more UEs may leave the area (e.g., in a temporary group). One or more of the following may be used to let the master equipment know when a UE leaves its area of control.

A UE may send a report to the network when it can no longer communicate or detect the master equipment or the quality goes below a threshold. For some configurations, this may even be a tampering/vandalism/theft report to the network (e.g., when the UE determines that it can no longer connect or detect it's master equipment or a special UE it may use it as a trigger to notify the network over a macro cell, that a security breach has been detected).

The UE may send a deregistering message to the old master equipment. If the UE can no longer communicate with the network, the network may notify the master equipment after receiving the report from the UE.

There may be a basic check message sent periodically by the UEs to the master equipment.

Periodic reporting from the UEs to the master equipment may be performed.

The master equipment may ping periodically the UEs under its control. If one of them does not answer, it may determine that it is not part of the group anymore.

The network may need to know which master equipment controls a UE. This may be accomplished via one or more of the following.

Master equipment may send a registration message, including the list of UEs under its control, to the network (e.g., periodically, any time a new UE joins or leaves its group etc.).

When master equipment performs a procedure the master equipment may list the UEs in its group.

The master equipment/UE association may be predetermined

Master equipment may perform measurements, mobility, and other procedures. The other UEs may remain in idle mode and not perform mobility procedures. They may stay connected to the master equipment and may be responsible for monitoring paging requests.

A UE may stay camped on the master equipment. The network may page the master equipment if it needs to page the UE. The master equipment can forward the paging to the UEs in the group. Paging from the network may be UE specific or group specific.

UEs may be in DRX and may need to monitor paging occasions to receive a page from master equipment. These may be the same as paging occasions for the network or different paging occasions. The paging occasions may be the same among the UEs so master equipment may forward the page once. Paging occasions may be UE specific, so, if a UE specific page from the network is arriving, other UEs need not receive the information. When a UE registers to master equipment, it may get a temporary group identity or temporary UE identity from which it may calculate paging occasions, or it may get paging occasions information (e.g., when to monitor), frame number of the paging occasion, and/or page indicator. A temporary identity or UE identity may also be received by the network.

When the master equipment receives a page from the network, it may page the corresponding UE or UEs under its control. The page may be a forward of the page from the network. The master equipment may relay the page to the UE or to the group of the UEs. The master equipment may be used to send an indication to the UE (or UEs) via a page, using one of the techniques disclosed herein, to tell the UE (or UEs) to wake up and connect/select to the macro cell to receive the page.

Where master equipment forwards the paging message, the UE may perform one or more of the following.

The UE may respond to the page via the master equipment.

The UE may start measuring neighbor cells and attempt to select and camp on a macro cell, read system information, connect to the cell and initiate the response to the page (e.g., for instance initiate a RRC connection request). In order to assist the UE with the cell selection, the master equipment may provide the UE with the PSC/PCI of the macro cell the master equipment is currently connected to, or the SIB's required to perform the basic operations, and UE specific potential information associated with the higher level location, routing, or tracking registration (this information may also be provided to the UE when the actual update takes place by the network). This information may be included in the paging message that is sent by the network and forwarded by the master. This may be performed autonomously or the UE may first tell the master cell that it is moving out of its coverage to connect to the macro cell.

Where master equipment is in charge of notifying the UE that the network wants to page the UE, one or more of the following may take place.

The paging indication, without a paging message, may indicate to the UE that it is to wake up and perform cell selection to the best cell. The UE may then send an RRC connection request to the network. The UE may also wait on the new cell to receive the actual paging message.

A paging message or a new message may be sent to the UE to indicate one or more of the following: the network is attempting to connect to the UE; one bit information is provided; or the master equipment provides information to assist the UE in connecting to the macro cell or the cell which the master is connected to.

Upon reception of the page, the UE may select to the cell and may stay awake for a predetermined period of time to receive the paging message or it may immediately initiate a RRC connection request.

The UE may notify the master equipment that the UE has received the paging or that it has moved to a different cell. The network may notify the master upon reception of the response.

Methods for the UEs to answer the page may include one or more of the following.

UEs may respond to the master equipment and the master equipment may forward the response. The forwarded response may: be a global response representing the UEs in the group, be a response concatenating the UEs responses, include the list of identities of the UEs and/or indicate to the network that the UEs under master equipment control have answered (the network may be aware of which UEs are under which master equipment control).

UEs may directly respond to the network in different ways, including: a UE may select the cell and respond and/or the UE may receive the PSC/PCI of the cell in paging and respond.

When a UE has data to transmit in the UL, e.g., mobile originated data, and the UE is connected to master equipment, one or more of the following may be performed in order to communicate with the network.

The UE may perform cell selection of the macro cell or a new cell and continue with normal solutions.

The UE may notify the master equipment that it wants to perform uplink access. The master equipment may provide information to assist the UE to perform cell selection on the new cell as described herein.

The master equipment may forward the request to the network.

The network may send a connection message for the UE via the master equipment providing handover information for the actual macro cell. This may also be applicable to the paging mechanisms described above.

When master equipment is used, it may be the master equipment that performs cell selection/reselection measurements, selects a cell and reselects a new cell when necessary, and sends area updates to the network, including periodic and non-periodic area updates.

When master equipment detects that it is in a new LA/RA/RA, it may send, depending on the mode, a Cell Update (UMTS) or a LA(UMTS)/RA(UMTS)/TA(LTE) update request to the network. If in idle mode, the master equipment may first send an RRC connection request and go through the RRC connection setup procedure before it sends a LA/RA/TA update request.

The message sent by the master to indicate a change of LA/RA/TA may include a list of the UEs in the group (list of identities), so that the network may know the UEs in the group are registering to a new area. Alternately, the message may not contain any list of UEs, since when the network needs to page the UEs, it may limit its page to the master.

The network may send a confirmation or configuration message to the master equipment including common and UE specific configuration to the master equipment. The master equipment may forward the message to the UEs in the group. The network may also send the message directly to each UE.

The master equipment may perform the measurements in connected mode on behalf of the UEs in the group. The network may send measurement controls to the master equipment and the master equipment may send measurement reports to the network.

Signaling during the handover may be reduced by performing one or more of the following.

The network may send the reconfiguration for the handover to the master equipment and the master equipment may forward it to the UEs in the group. The network may specify to the master equipment to which UEs it may need to send the reconfiguration. One or more of the following may apply.

The UEs in the group may answer the master equipment and: the master equipment may send a success notification to the network if each of the UEs in the group were able to handover on the new cell; the master equipment may indicate to the network which UEs were able to successfully handover and which UEs failed; and/or the master equipment may indicate to the network which UEs failed (i.e., could not handover to the new cell).

The master equipment may be used to forward reconfigurations or data common to all UEs in the group.

When reconfiguration or data is dedicated a single UE in the group, communication between UE and network may be used.

FIG. 2 illustrates a system with exemplary uses of master equipment to control and/or communicate with a network and one or more UEs in a group. FIG. 2 illustrates actions that take place on and/or between different equipment, e.g., UE 210 in a group of UEs, master equipment 220, and network 230. For example, FIG. 2 illustrates UE 210 finding a master equipment 220, registering with master equipment 220 and receiving an acceptance of the registration from master equipment 220. Master equipment 220 may send a list of registered UEs to network 230 and network 230 may accept the list.

FIG. 2 illustrates that master equipment 220 may perform other functions including measurements and detecting a change of area. Master equipment 220 may update network 230 and receive acceptance from network 230.

FIG. 2 illustrates that network 230 may communicate with UE 210 (or UEs) by using paging via master equipment 220.

What is claimed:

1. A method for optimizing communications relating to machine type communication devices, the method comprising:
   receiving, at a first user equipment (UE), an indication to operate according to an optimization procedure, wherein the optimization procedure is configured for the first UE, and wherein the first UE is a member of a group of machine type communication devices that includes a second UE;
   the first UE performing a cell reselection measurement;
   the first UE performing cell reselection based on the reselection measurement, when a cell reselection criteria is met; and
   the first UE monitoring a source cell for a confirmation message within a time period while preventing an uplink transmission from being sent, wherein the confirmation message is based on an uplink transmission from the second UE.

2. The method of claim 1, wherein the first UE foregoes sending a cell update to the network when the confirmation message is received before the time period has expired.

3. The method of claim 1, wherein the first UE sends a cell update to the network when the confirmation message is not received before the time period has expired.

4. A first user equipment (UE) configured, at least in part, to:
   receive an indication to operate according to an optimization procedure, wherein the optimization procedure is configured for the first UE, and wherein the first UE is a member of a group of machine type communication devices that includes a second UE;
   perform a cell reselection measurement;
   perform cell reselection based on the reselection measurement, when a cell reselection criteria is met; and
   monitor a source cell for a confirmation message within a time period while preventing an uplink transmission from being sent, wherein the confirmation message is based on an uplink transmission from the second UE.

5. The first UE of claim 4, wherein the first UE foregoes sending a cell update to the network when the confirmation message is received before the time period has expired.

6. The first UE of claim 4, wherein the first UE sends a cell update to the network when the confirmation message is not received before the time period has expired.

7. The method of claim 1, wherein the second UE is configured to perform an action on behalf of the group of machine type communication devices.

8. The first UE of claim 4, wherein the second UE is configured to perform an action on behalf of the group of machine type communication devices.

9. The method of claim 1, wherein the uplink transmission is a cell update or an UL message.

10. The first UE of claim 4, wherein the uplink transmission is a cell update or an UL message.

11. The method of claim 1, wherein the first UE is a non-special UE and the second UE is a special UE.

12. The first UE of claim 4, wherein the first UE is a non-special UE and the second UE is a special UE.

* * * * *